Aug. 5, 1969 R. E. SMITH 3,459,883

VIDEO SWITCHING CIRCUIT FOR LINE-SEQUENTIAL COLOR TELEVISION

Filed Dec. 1, 1966 3 Sheets-Sheet 2

VIDEO SWITCHING CIRCUIT FOR LINE-SEQUENTIAL COLOR TELEVISION

Filed Dec. 1, 1966 3 Sheets-Sheet 3

United States Patent Office 3,459,883
Patented Aug. 5, 1969

3,459,883

VIDEO SWITCHING CIRCUIT FOR LINE-SEQUENTIAL COLOR TELEVISION

Robert E. Smith, Richardson, Tex., assignor to Texas Instruments Incorporated, Dallas, Tex., a corporation of Delaware Filed Dec. 1, 1966, Ser. No. 598,302
Int. Cl. H04n 9/22, 9/44
U.S. Cl. 178—5.4 11 Claims

ABSTRACT OF THE DISCLOSURE

This specification discloses a switching circuit for applying a line-sequential color signal to the electron gun of a penetration-type color display tube. A relaxation oscillator has a frequency which is an integral submultiple of the rate at which the video lines are displayed, and is synchronized with the line display frequency. Voltage level detectors provide gating signals to video signal gating circuits when the voltage on the timing capacitor in the oscillator reaches specified levels. As a result, the parallel lines of video information are sequentially applied to the cathode ray tube.

This invention relates to a video switching circuit and more particularly to such a video switching circuit for selecting which of a plurality of different video signals is applied to an electron gun for display on a phosphor screen.

Among the several objects of the present invention may be noted the provision of a novel switching circuit for applying different video signals in sequence to an electron gun for display on a phosphor screen; the provision of such a circuit for switching different video signals representing respective color component images in a line sequential color display system; the provision of such a circuit which is reliable; and the provision of such a circuit which is relatively simple and inexpensive. Other objects and features will be in part apparent and in part pointed out hereinafter.

Briefly, a video switching circuit according to this invention is useful in a line sequential color display system employing a kinescope having an electron gun for displaying sequentially on a phosphor screen different video signals representing respective color component images. The circuit includes a capacitor and means for cyclically charging and discharging the capacitor at a frequency which is an integral submultiple of the rate at which successive video lines are displayed. The means for cyclically charging and discharging the capacitor includes means for synchronizing the frequency of charging and discharging with the line display rate. A level sensing circuit responds to the voltage appearing across the capacitor and provides an output signal when the charge on the capacitor exceeds a preselected level and this output signal controls gating means for passing the video signals in sequence to the kinescope gun for display on the phosphor screen.

The invention accordingly comprises the constructions hereinafter described, the scope of the invention being indicated in the following claims.

In the accompanying drawings in which various possible embodiments of the invention are illustrated, FIGURE 1 is a schematic circuit diagram of a three-color line sequential video signal switching circuit of the present invention;

Corresponding reference characters indicate corresponding parts throughout the several views of the drawings.

Figure 1:
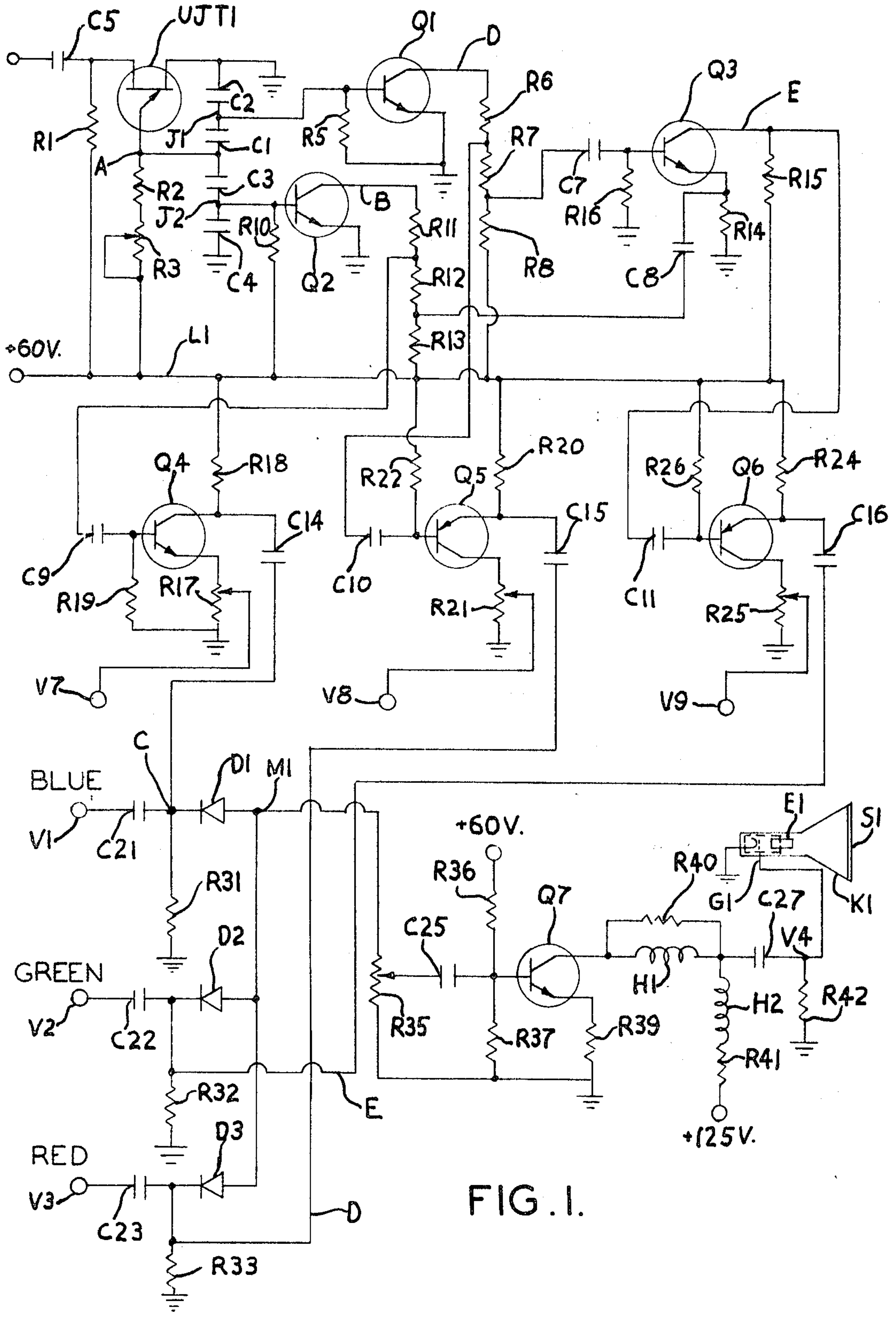

Referring now to FIGURE 1, it is assumed that the various D.C. supply voltages required are supplied to the circuit as indicated in the drawing. The circuit includes a unijunction transistor UJT1 connected in an essentially conventional relaxation oscillator circuit. A resistor R1 connects the base-two terminal of transistor UJT1 to a positive supply lead L1. The base-one terminal is connected to ground and the emitter is biased from lead L1 through a fixed resistor R2 and a rheostat R3. The emitter is also connected to ground through a capacitance which includes a first capacitive voltage divider comprising capacitors C1 and C2 connected in parallel with a second capacitive voltage divider comprising capacitors C3 and C4. As is understood by those skilled in the art, the unijunction transistor UJT1 is operative in this circuit to cyclically charge and discharge capacitors C1–C4 producing a substantially sawtoothed waveform at A, substantially as represented at A in FIGURE 2. The frequency at which the capacitors are charged and discharged may be synchronized with a signal of related frequency by means of a synchronizing signal coupled to the base-two terminal of unijunction transistor UJT1 through a capacitor C5.

The base terminal of an NPN transistor Q1 is connected to a junction J1 between capacitors C1 and C2 and this transistor functions as a voltage level sensing circuit which is responsive to the charge on the capacitors. The base terminal of transistor Q1 is biased toward cut-off by being connected to ground through a resistor R5. The emitter terminal of this transistor is connected to ground and the collector is connected to supply lead L1 through a load resistance comprising three resistors R6, R7 and R8 connected in series.

The base terminal of a second NPN transistor Q2 is connected to a junction J2 between capacitors C3 and C4, and this transistor also functions as a voltage level sensing circuit, being responsive to the charge on these capacitors. The base terminal of transistor Q2 is forward biased by a resistor R10 connecting the base terminal thereof to supply lead L1. The emitter of transistor Q2 is grounded and the collector is connected to the supply lead L1 through a load resistance comprising three resistors R11, R12 and R13 connected in series.

A signal taken from between resistors R7 and R8 is applied to the base terminal of an NPN transistor Q3 through a capacitor C7 and a signal taken from between resistors R12 and R13 is applied to the emitter of this transistor through a capacitor C8. The emitter of transistor Q3 is connected to ground through a resistor R14 and the collector is connected to supply lead L1 through a resistor R15. Transistor Q3 is normally biased toward cut-off by a resistor R16 connecting the base terminal thereof to ground. As is apparent to those skilled in the art, transistor Q3 responds essentially to the difference between the signals applied to its base and emitter terminals.

A signal taken from between resistors R11 and R12 is applied to the base terminal of an NPN driver transistor Q4 through a capacitor C9. The emitter of transistor Q4 is connected to ground through the fixed terminals of a potentiometer R17 and the collector is connected to supply lead L1 through a resistor R18. Transistor Q4 is normally biased toward cut-off by a resistor R19 connecting the base terminal to ground.

A signal taken from between resistors R6 and R7 is applied to the base terminal of a PNP driver transistor Q5 through a coupling capacitor C10. The emitter of transistor Q5 is connected to supply lead L1 through a resistor R20 and the collector is connected to ground through the fixed terminals of a potentiometer R21. Transistor Q5 is normally biased toward cut-off by a resistor R22 connecting its base terminal to the supply lead L1.

A signal taken from the collector transistor Q3 is applied to the base terminal of a PNP driver transistor Q6 through a coupling capacitor C11. The emitter of transistor Q6 is connected to supply lead L1 through a resistor R24 and the collector is connected to ground through the fixed terminals of a potentiometer R25. Transistor Q6 is normally biased toward cut-off by a resistor R26 connecting the base terminal thereof to supply lead L1.

Output signals taken from the collector terminal of driver transistor Q4 and from the emitter terminals of driver transistors Q5 and Q6 are applied, through respective coupling capacitors C14–C16, to the cathode sides of respective gating diodes D1–D3. The same end of each of the gating diodes D1–D3 is also connected to a respective video signal input terminal V1–V3 through a respective coupling capacitor C21–C23 and is biased toward ground potential by a respective resistor R31–R33.

The anodes of diodes D1–D3 are commonly connected to a summing or mixing junction M1 constituted by one of the fixed terminals of a potentiometer R35. The other fixed terminal of potentiometer R35 is connected to ground. The variable tap on potentiometer R35 is connected to the base terminal of an NPN output transistor Q7 through a coupling capacitor C25. A predetermined forward bias is also applied to this base terminal by means of a voltage divider comprising a pair of resistors R36 and R37 connected between a positive voltage supply terminal and ground. The emitter of transistor Q7 is connected to ground through a resistor R39 and the collector is connected to a positive voltage supply terminal through a video peaking network comprising an inductor H1 shunted by a resistor R40 and connected in series with an inductor H2 and a resistor R41. A signal taken from between inductors H1 and H2 is applied to a video output terminal V4 through a coupling capacitor C27. The D.C. voltage at the output terminal is normally biased to ground potential by means of a resistor R42.

Video output terminal V4 is connected to the grid G1 of a kinescope K1. Kinescope K1 includes a screen S1 and an electron gun E1. Screen S1 selectively emits light of three different colors when energized by an electron beam emitted by gun E1, the intensity of the light being modulated by the signal applied to grid G1.

This circuit is particularly useful in color display systems of the type disclosed in copending application Ser. No. 450,705, filed Apr. 26, 1965, in which the color of light emitted by a phosphor screen is controlled by varying electron beam accelerating voltages, the display of the different colors being synchronized with the application of different video signals to the gun so that each video signal representing a respective color component image is displayed in an appropriate color.

The operation of this circuit in such a display system is essentially as follows: The parameters of the relaxation oscillator circuit comprising unijunction transistor UJT1 are chosen so that the circuit inherently operates at substantially one-third of the line sweep rate being employed, i.e., at one-third of 15,750 c.p.s. or 5,250 c.p.s. in the NTSC system which is standard in this country. A conventionally derived horizontal sweep synchronizing signal is applied through capacitor C5 to the base-two terminal of unijuction transistor UJT1 to synchronize the oscillator frequency exactly with this integral submultiple of the horizontal sweep rate.

Figure 2:
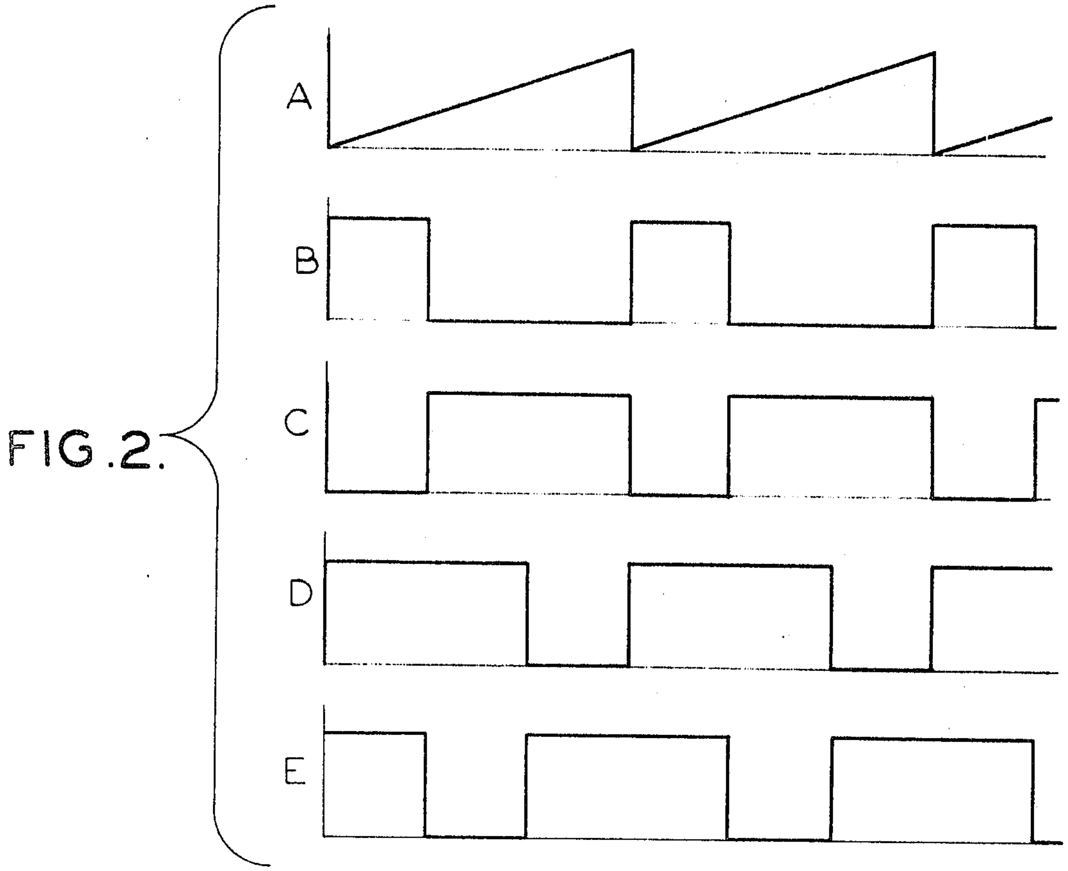
FIGURE 2 is a series of graphical waveform representations each of which illustrates the behavior of the voltage at a correspondingly designated portion of the circuit of FIGURE 1.

As noted previously, transistors Q1 and Q2 function as voltage level sensing devices responsive to the charge or voltage on the various capacitors C1–C4. Transistor Q2 is biased so that it conducts over two-thirds of the cycle of the uijunction transistor's oscillations. The conduction occurs over the last two-thirds of the sawtooth waveform, transistor Q2 being cut off when the capacitors are discharged by the breakdown of the emitter-base-one circuit of the unijunction transistor. The resulting waveform appearing at the collector of transistor Q2 is represented at B in FIGURE 2. Transistor Q4 inverts this waveform, so that a waveform as indicated at C in FIGURE 2 is applied to the cathode of gating diode D1. The negative-going portion of this wave forward biases diode D1 so that the diode passes a video signal applied to the input terminal V1.

Transistor Q1 is biased so that it conducts only one-third of the time, that is, during the last one-third of the sawtooth wave generated by the unijunction transistor relaxation oscillator. The waveform thus generated at the collector of transistor Q1 is represented at D in FIGURE 2. This waveform is transmitted, without inversion, through the driver amplifier transistor Q5, operated as an emitter-follower, to the cathode of gating diode D3. Thus, during the negative-going portions of the waveform represented at C in FIGURE 2, diode D3 is forward biased and will pass to mixing junction M1 a video signal applied at the input terminal V3.

As noted previously, a signal taken from between resistors R7 and R8 is applied to the base of transistor Q3. This waveformm is essentially the same as that indicated at D, although of smaller amplitude. Similarly it was previously mentioned that a signal taken from between resistors R12 and R13 is applied to the emitter of transistor Q3. This signal is essentially the same as that indicated at B in FIGURE 2, although also of smaller amplitude.

Transistor Q3 conducts substantially only when the signal applied to its base is positive with respect to the signal applied to its emitter. By comparing the waveforms represented at B and D in FIGURE 2, it can thus be seen that transistor Q3 is forward biased into conduction only during the middle one third of the period of the sawtooth waveform represented at A. At E is represented the resulting waveform generated at the collector of transistor Q3. This waveform is transmitted, without inversion, through driver transistor Q6, operating as an emitter follower, to the cathode side of gating diode D2 where it forward biases that diode during the negative portions of the waveform represented at E. Thus, during these negative portions, a video signal applied at terminal V2 is passed through the gating diode to the mixing junction M1. By comparing the waveforms represented at C, E and D in FIGURE 2 which are applied to the cathodes of gating diodes D1, D2 and D3 respectively, it can be seen that these diodes are forward biased in sequence and that therefore video signals such as conventionally derived blue, green and red video signals, applied to terminals V1, V2 and V3 are applied sequentially to mixing junction M1 during successive one-thirds of the cycle of the unijunction relaxation oscillator. Since the unijunction relaxation oscillator operates, as explained previously, with a period which is equal to three line sweep periods, it can be seen that the video signals are passed to mixing junction M1 and thence to the video output terminal V4 and kinescope K1 on respective successive lines. The signal provided at terminal V4 is thus suitable for modulating the electron beam current in a line sequential color display system employing a single electron gun, the color of the light emitted by the phosphor screen being changed by means apart from the electron gun, as for example by stepping or changing the electron accelerating voltage between the gun and the screen as disclosed in the aforementioned copending application Ser. No. 450,705. Signals appropriate for synchronizing the switching or stepping of the electron accelerating voltage with the video switching are provided at terminals V7, V8 and V9 which are connected to the variable terminals of potentiometers R17, R21 and R25.

Figure 3:
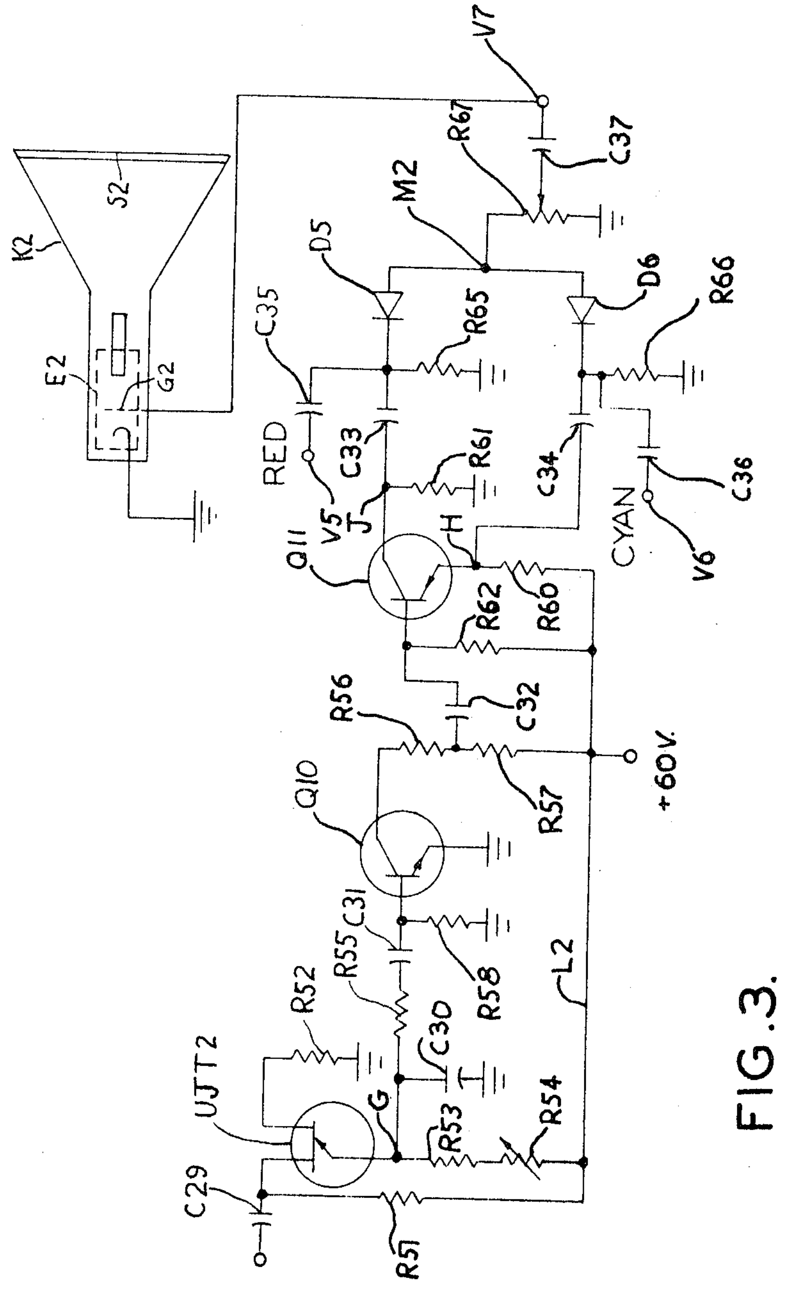
FIGURE 3 is a schematic circuit diagram of a two-color line sequential video signal switching circuit.

Referring now to the two-color embodiment of this invention illustrated in FIGURE 3, there is indicated at UJT2 a unijunction transistor which is connected in a relaxation oscillator circuit providing a generally sawtooth-shaped waveform having a period equal to two line sweep periods. The base-two terminal of unijunction transistor UJT2 is connected to a positive voltage supply lead L2 through a resistor R51, and the base-one terminal is connected to ground through a resistor R52. The emitter of this unijunction transistor is forward biased by being connected to lead L2 through a fixed resistor R53 and a rheostat R54. The emitter is also connected to ground through a capacitor C30. This relaxation oscillator circuit is operative to produce a waveform across capacitor C3 having generally sawtooth characteristics. This sawtooth waveworm is coupled to the base terminal of an NPN transistor Q10 through a resistor R55 and a capacitor C31. The emitter of transistor Q10 is grounded and its collector is connected to supply lead L2 through a pair of serially connected resistors R56 and R57. Transistor Q10 is normally biased toward cut-off by a resistor R58 connecting its base terminal to ground.

A signal taken from between resistors R56 and R57 is applied to the base terminal of a PNP transistor Q11 through a coupling capacitor C32. The emitter of transistor Q11 is connected to supply lead L2 through a resistor R60 and its collector is connected to ground through a resistor R61. Transistor Q11 is normally biased toward cut-off by a resistor R62 connecting its base terminal to the supply lead L2. A signal taken from the collector of transistor Q10 is applied, through a coupling capacitor C33, to the cathode side of a gating diode D5, and a signal taken from the emitter of transistor Q10 is applied, through a coupling capacitor C34, to the cathode side of a second gating diode D6. The cathode sides of diodes D5 and D6 are biased toward a nominal ground potential by resistors R65 and R66, respectively. The cathode of diode D5 is connected to a video signal input terminal V5 by a coupling capacitor C35, and the cathode of diode D6 is connected to a second video signal input terminal V6 by a coupling capacitor C36. The anode terminals of gating diodes D5 and D6 are commonly connected to a summing or mixing junction M2 and to one of the fixed terminals of a potentiometer R67, the other end of which is grounded. A video signal output terminal V7 is connected to the movable tap of potentiometer R67 through a coupling capacitor C37.

Video signal output terminal V7 is connected to the grid G2 of a kinescope K2. Kinescope K2 includes a screen S2 and an electron gun E2. Screen S1 selectively emits light of two different colors when energized by an electron beam emitted by gun E2, the intensity of the light being modulated by the signal applied to grid G2.

Figure 4:
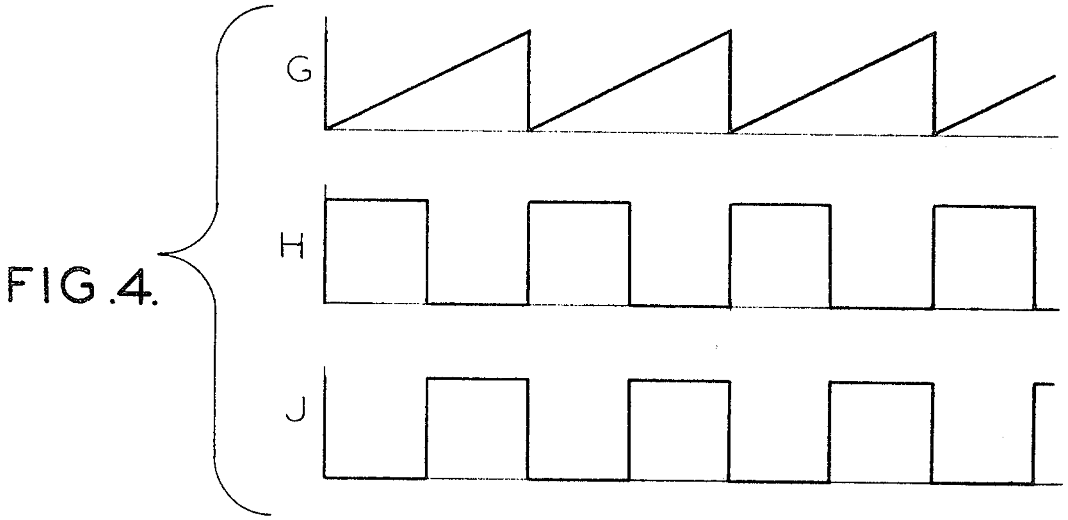
FIGURE 4 is a series of graphical waveform representations each of which illustrates the behavior of the voltage at a correspondingly designated portion of the circuit of FIGURE 3.

The operation of this circuit is analogous to that of FIGURE 1. The parameters of the unijunction transistor oscillator circuit are selected so that its normal frequency of operation is half that of the line repetition rate, and its oscillations are synchronized with the line sweep by applying the horizontal synchronizing signal to the base-two terminal of the unijunction transistor UJT2 through capacitor C29. Transistor Q10 is operated as a level sensing device responsive to the voltage appearing across capacitor C30. Transistor Q10 is biased so that it conducts half of the time, that is, the transistor is cut off during the first half of the sawtooth waveform appearing across capacitor C30 and conducts during the last half of each such sawtooth waveform. A square wave output signal is thus provided at the collector of transistor Q10 substantially as represented at H in FIGURE 4. A portion of this signal taken from between resistors R56 and R57 is applied to transistor Q11 which is operated as a conventional phase splitter. The phase splitting operation of transistor Q11 is such that a signal essentially similar to that represented at H is generated at the emitter of transistor Q11 and a similar but inverted signal is generated at the collector of this transistor as represented at J in FIGURE 4.

The negative-going portions of the waveforms generated at the emitter and collector of transistor Q11 are operative to forward bias the diodes D5 and D6 in alternation so that first the video signal present at terminal D5 and then the video signal present at terminal V6 are applied to the video signal output terminal V7 and to kinescope grid G2.

It can thus be seen that this circuit is siutable for modulating the electron beam current in a single gun, line sequential, two-color kinescope. An example of a color display system in which this circuit is particularly useful is disclosed in copending application Ser. No. 452,-299, filed Apr. 30, 1965.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a line sequential color display system employing a kinescope having at least one electron gun for displaying sequentially on a phosphor screen different video signals representing respective color component images, a video switching circuit comprisings a capacitor;

means for cyclically charging and discharging said capacitor at a frequency which is an integral submultiple of the rate at which successive video lines are displayed, said means including means for synchronizing said frequency with said line display rate;

a level sensing circuit responsive to the voltage appearing across said capacitor for providing an output signal when the charge on said capacitor exceeds a preselected level; and gating means controlled by said output signal for passing said video signals in sequence to said gun for display on said screen.

2. A video switching circuit as set forth in claim 1 wherein said capacitor and said means for charging and discharging said capacitor comprise a relaxation oscillator.

3. A video switching circuit as set forth in claim 1 wherein said means for charging and discharging said capacitor includes a unijunction transistor.

4. A video switching circuit as set forth in claim 3 wherein said means for synchronizing includes means for applying a horizontal synchronizing signal to said unijunction transistor.

5. A video switching circuit as set forth in claim 1 wherein said level sensing circuit includes a transistor the base terminal of which is connected to said capacitor.

6. A video switching circuit as set forth in claim 1 wherein said gating means includes a diode which is periodically forward biased by said output signal to pass a video signal.

7. In a line sequential three-color display system employing a kinescope having an electron gun for displaying sequentially on a phosphor screen three different video signals representing r espective color component images, a video switching circuit comprising:

a capacitance;

means for cyclically charging and discharging said capacitance at a frequency which is one-third of the rate at which successive video lines are displayed, said means including means for synchronizing said frequency with said line display rate;

a first level sensing circuit connected to said capacitance for providing a first output signal when the charge on said capacitance exceeds a first preselected level;

- gating means controlled by said first output signal for passing a first video signal to said gun for display on said screen;
- a second level sensing circuit connected to said capacitance for providing a second output signal when the charge on said capacitance exceeds a second preselected level;
- gating means controlled by said second output signal for passing a second video signal to said gun for display on said screen;
- means responsive to said first and second output signals for providing a third output signal when the charge on said capacitance is between said first and second levels; and
- gating means controlled by said third output signal for passing a third video signal to said gun for display on said screen.

8. A video switching circuit as set forth in claim 7 wherein said capacitance comprises first and second capacitive voltage dividers connected in parallel, said first level sensing circuit being connected to said first divider and said second level sensing circuit being connected to said second divider.

9. A video switching circuit as set forth in claim 7 wherein said means for charging and discharging said capacitance includes a unijunction transistor and, together with said capacitance, comprises a relaxation oscillator.

10. A video switching circuit as set forth in claim 7 wherein each of said gating means comprises a diode which is forward biased by the respective output signal for passing the respective video signal.

11. In a line sequential color display system employing a kinescope having at least one electron gun for displaying sequentially on a phosphor screen different video signals representing respective color component images, a video switching circuit comprising:

- a first video input terminal for receiving a first one of said video signals;
- a second video input terminal for receiving a second one of said video signals;
- a summing junction adapted to be connected to said electron gun;
- a first diode connecting said first video input terminal to said summing junction;
- a second diode connecting said second video input terminal to said summing junction; and
- means for forward biasing said diodes during respective time intervals thereby to pass video signals applied to said first and second video input terminals to said electron gun during said respective time intervals for display on said screen.

References Cited

UNITED STATES PATENTS

| | | | |
|---|---|---|---|
| 2,883,451 | 4/1959 | Keizer | 178—5.4 |
| 2,908,749 | 10/1959 | Burgett | 178—5.4 |
| 2,969,423 | 1/1961 | Smith | 178—5.4 |
| 3,413,409 | 11/1968 | Giles | 178—5.4 |

RICHARD MURRAY, Primary Examiner

JOHN MARTIN, Assistant Examiner